April 17, 1956 — R. O. HENSZEY — 2,742,083
FALLING FILM EVAPORATOR
Filed July 2, 1952

INVENTOR.
ROY O. HENSZEY
BY
Wheeler, Wheeler, + Wheeler
ATTORNEYS

# United States Patent Office 2,742,083
Patented Apr. 17, 1956

2,742,083

FALLING FILM EVAPORATOR

Roy O. Henszey, Oconomowoc, Wis.

Application July 2, 1952, Serial No. 296,972

5 Claims. (Cl. 159—13)

This invention relates to a falling film evaporator.

The invention segregates vapor from liquid in a chamber into which a mixture of vapor and liquid is discharged downwardly from the evaporator tubes. A conical baffle is disposed in the path of the mixture of vapor and liquid and the evaporator shell is provided with a complementary frusto-conical skirt spaced from the conical baffle. Mounted at a downward inclination on the surface of the conical baffle are vanes disposed at an angle of approximately 45° to the radius of the cone. These vanes substantially fill the space between the cone and the skirt and deflect the downwardly moving liquid and gas sharply with a tangential component. Upon this abrupt change of direction, the high inertia of the liquid causes the liquid to flow along the surfaces of the vanes, the lighter vapor being displaced into separate strata flowing outwardly above the resulting streams of liquid. Gravity causes the liquid to continue downwardly to the bottom of the chamber while the vapor travels in a helical path upwardly to a top outlet.

Since many installations in which the present device may be used pertain to the concentration of liquid foods such as milk or the like, an important feature of the present invention consists in the ease with which the apparatus may be cleaned and kept sanitary. The vanes are mounted on the cone, free of connection with the complementary skirt, the cone and vanes being supported by a single screw and unitarily removable for cleaning.

The invention is adapted to any falling film evaporator whether the liquid is regarded as being sufficiently concentrated in one pass through the evaporator or whether it is re-circulated or whether it is withdrawn for further treatment elsewhere.

Figure 1:
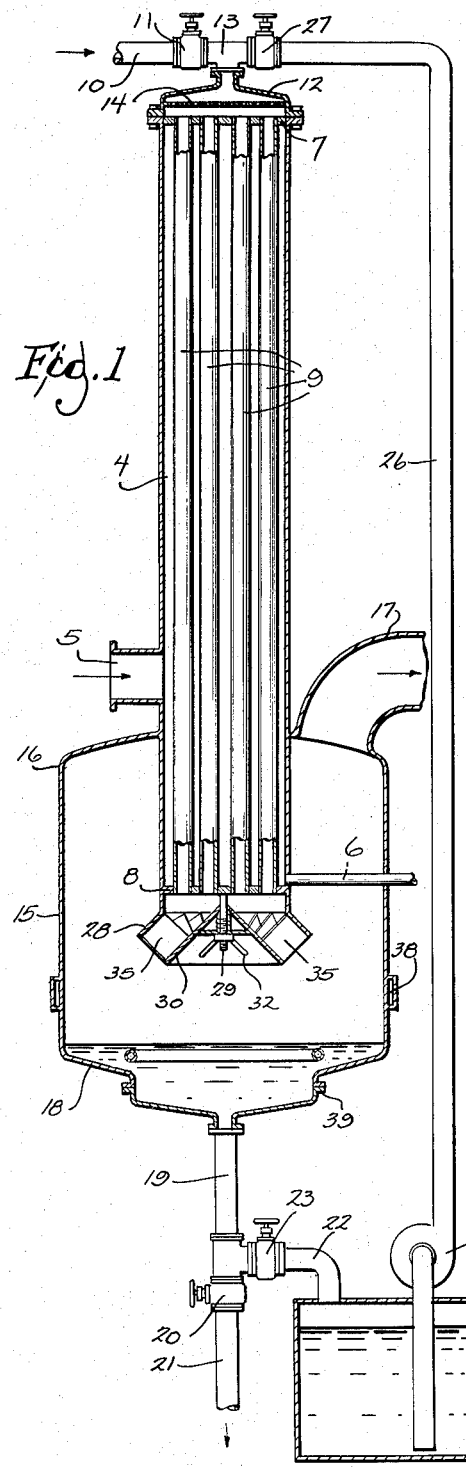
Fig. 1 is a view in vertical axial section through an evaporator embodying the invention.

The evaporator comprises a steam jacket 4 into which steam or hot vapor is admitted to the inlet 5, resulting condensation being discharged through pipe 6. The jacket 4 is closed at its top and bottom by tube sheets 7 and 8, respectively, between which extend the several evaporator tubes 9 through which flows the liquid to be concentrated, or from which vapor is to be evaporated.

The supply of such liquid arrives through a pipe 10 subject to the control of a valve 11, which communicates through T 13 with a header or cap 12 bolted or otherwise suitably connected to the tube sheet. Uniformity of distribution is facilitated by a foraminous plate 14. Welded or otherwise secured to the jacket to enclose the lower end thereof and receive the discharge from tubes 9 is the separating vessel or receptacle 15, the upper portion 16 of which constitutes a vapor dome from which vapor is discharged through pipe 17, either for condensation or release or further use, according to the nature of the apparatus. The bottom portion 18 of the vessel 15 comprises a sump in which liquid may stand at the level indicated. Excess liquid may be drawn off through pipe 19 for discharge or for further use, according to the nature of the apparatus. Valve 20 controls the flow through pipe extension 21. A branch pipe 22 is controlled by valve 23 and may be used to admit all or a portion of the liquid into a receiving tank 24 from which it may be re-circulated by pump 25 through pipe 26 and valve 27 to the T 13 for a further pass through the evaporator.

The evaporator jacket tube 4 is provided within vessel 16 with a frusto-conically flaring skirt 28. Centrally within the skirt a support 29 connected with tube sheet 8, and here shown as comprising a bolt, supports a conical baffle 30 which has interiorly a tubular guide at 31 to receive the bolt, the baffle being detachably connected with the bolt by a wing nut 32. The baffle 30 and skirt 28 may be parallel, as shown. Parallelism, however, is optional, it being important only that the baffle and its vanes be unitarily removable.

An annular series of vanes 35 is mounted on the conical baffle 30 for unitary handling therewith. Each vane is desirably connected with the cone solely along its lower margin, welding being a convenient means of effecting such connection. The respective vanes are downwardly inclined on the baffle but are pitched at acute angles to radii drawn from their outer ends to the axis of the cone. I have found it desirable to use an angle of about 45° between each vane surface and the radius drawn to the outer edge of the respective vane. The outer margins of the vanes desirably fit closely to the inner surface of the skirt 28 when the conical baffle is assembled with the evaporator as shown in Fig. 1.

The operation of the device is as follows:

Assuming the device to be used as a single pass evaporator, the pump 25 is inoperative and the valves 23 and 27 are closed, while valves 11 and 20 are open. The liquid to be evaporated is supplied through pipe 10 and flows downwardly through evaporator tubes 9 where the heat derived from steam or vapor in jacket 4 transforms some of the liquid into vapor. As the mixture of liquid and vapor flows from the lower ends of tubes 9, it strikes the conical baffle 30 and flows outwardly thereover with a considerable downward component. This aids in effecting separation of liquid from vapor and minimizes the impact of the liquid, thus preventing any more atomization thereof than is necessary.

As the mixture of liquid and gas moves outwardly and downwardly on the surface of the conical baffle 30, different portions thereof encounter different vanes 35 and are caused to flow in streams in directions having downward and tangential components. The fact that the liquid streams have much greater inertia than the gaseous streams, taken with the fact that the vanes 35 are angularly disposed with reference to the path of flow, will cause the liquid streams to flow over the surfaces of the vanes, displacing the gaseous streams inwardly.

As the liquid and gaseous streams leave the lower margin of the conical baffle, the liquid streams will tend to continue in a downward and outward direction into contact with the lower portion of the inner surface of the wall of vessel 15 and with the surface of the liquid pool, while the lesser momentum of the gaseous streams will allow these to change direction and flow helically upwardly in vessel 15 toward the outlet 17. The fact that the two streams are distinct as they issue from between the conical baffle 30 and skirt 28 facilitates this separation. The continued downward and generally tangential movement of the liquid streams not only reduces spray but tends to beat down any foam which may be rising from the liquid in the sump at the bottom of receptacle 15. Foaming is further controlled, desirably, by a chill ring 38 as described in my companion application Serial No. 701,558, filed October 5, 1946, now Patent No. 2,604,154, and entitled Apparatus and Method for Controlling Foam.

If the liquid is being re-circulated through the evaporator, the valve 20 will be closed and the valves 23 and 27 will be opened. Pump 25 will be in operation and valve 11 will either be closed or will be open just sufficiently to supply makeup liquid. The great majority of the liquid traversing the evaporator will be re-circulated by the pump. The operation will be essentially as above described.

Figure 2:
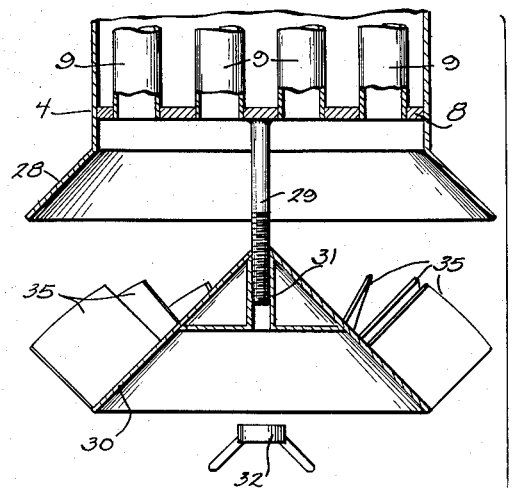
Fig. 2 is an enlarged detail view in axial section of the lower end of the evaporator and skirt showing how the baffle is removed for cleaning.
Figure 3:
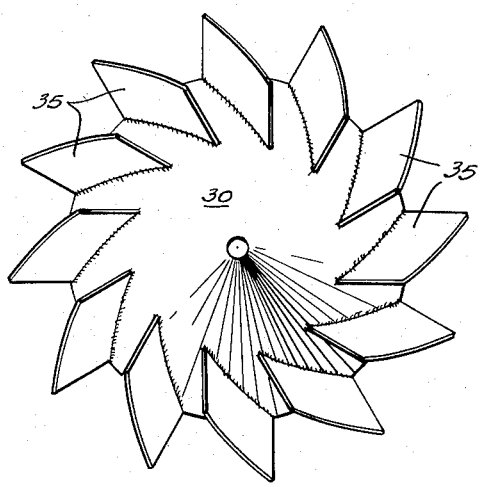
Fig. 3 is a plan view of the separate baffle with its attached vanes.

When cleaning is desired, the bottom closure 39 of receptacle 15 may be removed to obtain access to the wing nut 32. Removal of this nut allows the conical baffle 30 and vanes 35 to be withdrawn unitarily as shown in Fig. 2. When the baffle and vanes are thus withdrawn, there are no surfaces which are not completely accessible for cleaning.

I claim:

1. In a falling film evaporator, the combination with a jacket and a plurality of tubes extending therethrough, a support beneath said jacket and substantially centered with respect to said tubes, a conical baffle mounted substantially at its apex upon said support and having a downwardly inclined conical surface disposed beneath the several tubes, a plurality of vanes in annular series about the baffle and having their lower margins connected with said conical surface, each of said vanes being pitched at an oblique angle with respect to a radius drawn from the axis of said cone to the outer edge of the baffle, together with a receptacle enclosing said baffle and vanes and having a wall spaced from the periphery of said baffle and arranged to receive material discharged from said tubes onto the surface of the baffle and deflected by the respective vanes.

2. In a falling film evaporator, the combination with a jacket having a bottom comprising a tube sheet, and evaporator tubes opening downwardly through said tube sheet, of a frusto-conical skirt and means mounting said skirt at the bottom of said jacket, said skirt being in peripherally surrounding downwardly dependent relation to said tube sheet, a central support depending from said tube sheet, a conical baffle connected substantially at its apex with said support and spaced at its periphery from said skirt, and vanes mounted on the conical baffle and extending into immediate proximity to the skirt, each of said vanes being disposed at an acute angle to a radius of the conical baffle drawn from the baffle axis to the outer end of the vane.

3. The device of claim 2 in further combination with a nut connected with the support and engaging the baffle, the baffle having a bearing through which said support extends, and the vanes being fixed to the baffle independently of the skirt for unitary placement and removal with the baffle.

4. The device of claim 3 in which said baffle and skirt are substantially parallel.

5. A falling film evaporator comprising a tubular jacket, a receptacle enclosing the lower end of the jacket, said lower end comprising a tube sheet, evaporator tubes extending through the jacket and opening through said tube sheet for downward discharge into said receptacle, said tube sheet being at a point intermediate the top and bottom of the receptacle, a frusto-conically flaring skirt and means connecting said skirt to the evaporator on which said skirt is disposed within the receptacle in spaced relation to the wall thereof, said skirt being in peripherally surrounding downwardly dependent relation to said tube sheet, a bolt depending from said tube sheet at a point centrally disposed with respect to said tubes, a conical baffle having an axial bearing through which said bolt extends, said baffle having its lower margin spaced from the wall of the receptacle but extending outwardly to a sufficient radius to intercept all effluent from the several tubes, a nut on said bolt in supporting relation to the baffle, and a set of vanes marginally connected to the baffle and projecting upwardly therefrom into substantial engagement with said skirt but free of connection therewith, each of said vanes being correspondingly pitched at an acute angle to a radius of said baffle drawn from its axis through the outer end of the vane, whereby each of said vanes deflects effluent discharged over the surface of the baffle from the respective tubes for effecting a separation of liquid effluent from vapor and discharging separate streams of liquid and vapor downwardly upon a path having a substantial tangential component, the said receptacle having a vapor outlet above said skirt to which the vapor streams helically ascend while the greater inertia of the streams of liquid constrain them to continue downward movement in said receptacle, said receptacle having at a level below said baffle an outlet for liquid moving downwardly in said receptacle, and said baffle and vanes being unitarily removable from said bolt and unitarily replaceable therein.

References Cited in the file of this patent

UNITED STATES PATENTS

| 1,525,136 | Kopke | Feb. 3, 1925 |
| 2,090,985 | Peebles | Aug. 24, 1937 |
| 2,359,078 | Baumann | Sept. 26, 1944 |
| 2,537,346 | Henszey | Jan. 9, 1951 |
| 2,624,401 | Schilt | Jan. 6, 1953 |

FOREIGN PATENTS

| 70,024 | Germany | July 29, 1893 |
| 472,235 | Great Britain | Sept. 20, 1937 |
| 670,476 | Germany | Jan. 19, 1939 |